Patented Dec. 4, 1945

2,390,470

UNITED STATES PATENT OFFICE 2,390,470

PREPARATION OF $\alpha,\beta$-DICHLORO-PROPIONITRILE

John K. Sumner, Langhorne, Pa., assignor to Röhm & Haas Company, Philadelphia, Pa., a corporation of Delaware No Drawing. Application December 17, 1941, Serial No. 423,298

4 Claims. (Cl. 204—158)

This invention relates to the production of $\alpha,\beta$-dichloropropionitrile. It relates to the preparation of the above compound by the direct chlorination of acrylonitrile in the presence of light and in the absence of substantial amounts of oxygen and water. An object of the invention is to produce $\alpha,\beta$-dichloropropionitrile in yields which are far higher than obtained heretofore.

Methods previously suggested for the preparation of $\alpha,\beta$-dichloropropionitrile have resulted in yields which were low or which simultaneously produced compounds such as $\alpha$-chloro,$\beta$-hydroxypropionitrile. The formation of these other compounds effectively reduced the yield of the more desirable product, namely, $\alpha,\beta$-dichloropropionitrile, which is of particular value as an intermediate for the production of other compounds, including $\alpha$-chloroacrylonitrile. Dichloropropionitrile, furthermore, has been found to have insecticidal value.

The chief advantage of this invention is the improved yield which is obtained by this process. Whereas earlier methods produced yields below 30% of theory, my invention produces yields in excess of 60%. For the most part, only one product, $\alpha,\beta$-dichloropropionitrile, is formed by my process, aside from some small amount of high-boiling polymeric material. Advantage results from the fact that the reaction is carried out in an anhydrous, or non-aqueous, medium in the presence of visible light. In prior practice, water was present during the reaction and, as a result, by-products were formed. Also, in the presence of the water, there was always the danger or possibility that hydrolysis of the nitrile to the amide or acid would occur.

I have found that $\alpha,\beta$-dichloropropionitrile can be produced in improved yields by the addition of chlorine to acrylonitrile in the presence of visible light and in the presence or absence of an organic solvent. When the process is carried out in the presence of solvents, the anhydrous, oxygen-free chlorine gas is led directly from a cylinder containing the compressed liquid through a flow meter into a mechanically stirred mixture of acrylonitrile and carbon tetrachloride which is illuminated with visible light from an ordinary Mazda lamp. The rate of flow of the gas is not critical, but the preferred method is to introduce the gas at approximately the rate of that at which it is absorbed. The preferred amount of chlorine introduced when solvents are present is approximately one-third of the amount chemically equivalent to the amount of acrylonitrile present. If more than this amount of chlorine is used, the formation of by-products is favored. When the process is operated in the absence of a solvent, anhydrous, oxygen-free chlorine is led from the cylinder into the acrylonitrile at the same rate as when solvent is present, but the amount added is slightly more than the amount which is chemically equivalent to the amount of acrylonitrile present, so that, when the reaction is complete, there is little or no acrylonitrile remaining, and the product is almost solely $\alpha,\beta$-dichloropropionitrile. After the proper amount of chlorine has been added, the flow is stopped, and the reaction mixture is allowed to stand until the reaction is substantially complete. Thereafter, the mixture is transferred to equipment suitable for distillation. If solvent has been used, the mixture is distilled at normal atmospheric pressure until the solvent and unreacted acrylonitrile are removed. Thereafter, vacuum is applied, and the distillation is completed at a reduced pressure of 36 mm. The fraction boiling at 85–87° C. at 36 mm. is retained and analyzed. Ordinarily, the analysis shows a chlorine content of 56+%, indicating that the product is $\alpha,\beta$-dichloropropionitrile, which has a theoretical chlorine content of 57.2%. If no solvent has been used during the reaction, the distillation at normal pressure may be eliminated, and reduced pressure is applied at the outset.

The temperature at which the reaction is conducted may vary. In the absence of solvent, the reaction may be made to take place at temperatures up to 100° C., while, in the presence of solvents, the temperature may be as high as the boiling point of the solvent. However, temperatures within the range of about 20° C. to 30° C. are preferred because the reaction is more readily controlled thereat and the tendency of the acrylonitrile to polymerize is much less at 20–30° C. than at higher temperatures. Inasmuch as the reaction is exothermic, it may be desirable to employ cooling devices to avoid a rise in temperature. Somewhat better yields may be obtained at temperatures as low as 0° C., but such low temperatures are not easily maintained.

Two factors which exert a substantial influence on the rate of reaction are light and oxygen. It is particularly desirable to conduct the reaction in the presence of visible light, either sunlight or artificial; and, in the absence of such light, the reaction proceeds very slowly, if at all. Likewise, the presence of oxygen from any source must be avoided because oxygen is a powerful anti-catalyst. If the agitation is too vigorous, enough air may be beaten into the solution to markedly retard the reaction. A stirrer is used only to facilitate the better distribution of the gas. Other gas-distributing devices may be used. If the shape of the reaction vessel is such that the gas tends to distribute itself, as when the vessel has a height which is great compared with its width or diameter, no distributing devices are required. However, when the area of the surface of the reaction mixture is relatively small, as in a cylindrical vessel of small diameter, and the surface is relatively undisturbed, the presence of the air has no appreciable retarding action. The anti-catalytic effect of oxygen is greatest when the gas, or air, is dissolved in either of the reactants.

The construction of the apparatus is not limited to glass. Any material which is not affected by the corrosive action of the mixtures may be used. If the reaction vessel is of opaque material, such as a metal or alloy, the necessary illumination can be supplied through glass windows in the vessel, or by means of corrosion-proof lamps and electrical connections inside the vessel.

Carbon tetrachloride is the preferred solvent, but any non-aqueous solvent which is inert and does not react with chlorine or acrylonitrile under the conditions above noted may be used. The preferred amount is approximately one and one-half times the weight of the acrylonitrile.

Although it is preferred to conduct this reaction at atmospheric pressure, increased pressure may be employed.

The following examples will serve to illustrate my process:

Example 1

229 grams of acrylonitrile and 355 grams of carbon tetrachloride were placed in a two-liter three-necked flask, equipped with a reflux condenser, stirrer, and inlet tube to admit chlorine. The mixture was slowly stirred, and chlorine was passed at a rate of 1.44 mols per hour through the inlet tube, which extended to a point near the bottom of the flask. The flask was illuminated by means of three 200-watt lamps in reflectors. The temperature of the mixture was maintained at 20° to 25° C. throughout by immersing the flask in an ice bath. After the chlorine had been added for an hour, the supply was shut off, the ice bath was removed, and the reaction mixture was maintained at room temperature for one hour. The contents of the reaction flask were transferred to a distilling flask, and the reaction flask was rinsed with approximately fifty grams of carbon tetrachloride, which was then added to the mixture in the distilling flask. The carbon tetrachloride and unreacted acrylonitrile were removed by distillation at atmospheric pressure, and 531 grams of a mixture having a total nitrogen content of 7.29% was obtained. This amount of nitrogen was equivalent to 27.6% of acrylonitrile or 147 grams of the latter in the distillate. After the carbon tetrachloride and the acrylonitrile had been removed, the distillation was continued under a reduced pressure of 36 mm. and, after a small amount of mixture had distilled over, the temperature reached 86° C. and, at this temperature, 128 grams of product was obtained. Said product, $\alpha,\beta$-dichloropropionitrile, was analyzed and was found to contain 56.1% chlorine, whereas the theoretical amount of chlorine in dichloropropionitrile is 57.2%. 38 grams of a high-boiling residue was left in the distilling flask. The yield of $\alpha,\beta$-dichloropropionitrile, based on the amount of unrecovered acrylonitrile, was 65% of theory.

The distilled mixture of carbon tetrachloride and acrylonitrile may be used in a subsequent chlorination reaction after the ratio of the two has been adjusted to approximately 3 to 2.

Example 2

114.5 grams of acrylonitrile was placed in a one-liter three-necked flask equipped with a reflux condenser, thermometer, and an inlet tube which extended to a point near the bottom of the flask. The flask and contents were illuminated by means of a 200-watt lamp placed near to the flask. Chlorine was admitted at the rate of 1.9 mols per hour and was added directly to the acrylonitrile. A reaction began almost immediately, as evidenced by the evolution of heat. By the use of an ice bath, the temperature of the reaction mixture was maintained between 25° and 30° C. After one and one-half hours, the supply of chlorine was shut off, the ice bath was removed, and the reaction was allowed to proceed for one hour at room temperature. At that point, the mixture was removed to a distillation flask and distilled under a reduced pressure of 36 mm. Three fractions were obtained as follows: Fraction A, which distilled below 86° C. and weighed 18.4 grams; fraction C, which weighed 35 grams and remained as a polymeric residue in the reaction flask; and fraction B, which weighed 117.4 grams and distilled at 86–87° C. and had a chlorine content of 57.4% and was identified as $\alpha,\beta$-dichloropropionitrile. This yield of the latter corresponded to 79% of theory, based on the amount of unrecovered acrylonitrile.

I claim:

1. The process for the production of $\alpha,\beta$-dichloropropionitrile which comprises reacting anhydrous, oxygen-free chlorine with acrylonitrile in the liquid phase at temperatures of about 0° C. to about 100° C. in the presence of visible light and in the absence of oxygen and water.

2. The process for the production of $\alpha,\beta$-dichloropropionitrile which comprises reacting anhydrous, oxygen-free chlorine with acrylonitrile in the liquid phase at temperatures of about 0° C. to about 100° C. in the presence of organic solvents which do not react with the above reactants at the above temperatures and visible light and in the absence of oxygen and water.

3. The process for the production of $\alpha,\beta$-dichloropropionitrile which comprises reacting anhydrous, oxygen-free chlorine with acrylonitrile in the liquid phase at temperatures of about 0° C. to about 100° C. in the presence of carbon tetrachloride and visible light and in the absence of oxygen and water.

4. The process of producing $\alpha,\beta$-dichloropropionitrile which comprises reacting acrylonitrile in the liquid phase with anhydrous, oxygen-free chlorine at temperatures of about 0° C. to about 100° C. in the presence of organic solvents which do not react with the above-noted reactants at the temperatures aforesaid, in the presence of visible light and in the absence of oxygen and water, the chlorine being present in approximately one-third of the amount chemically equivalent to the amount of acrylonitrile present.

JOHN K. SUMNER.